United States Patent [19]

Matsunobu et al.

[11] Patent Number: 5,330,781
[45] Date of Patent: Jul. 19, 1994

[54] BOILED AND SEASONED PEANUTS WITH SHELL, AND METHOD FOR PREPARATION THEREOF

[75] Inventors: Akira Matsunobu, Nishinomiya; Sumio Horishita, Kobe; Rhuichiro Konaka, Nagasaki, all of Japan

[73] Assignee: Ton Co., Ltd., Hyogo, Japan

[21] Appl. No.: 802,887

[22] Filed: Dec. 6, 1991

[30] Foreign Application Priority Data

Dec. 6, 1990 [JP] Japan .................................. 2-417695

[51] Int. Cl.$^5$ .............................................. A23L 1/36
[52] U.S. Cl. .................................... 426/632; 426/443; 426/460; 426/634
[58] Field of Search ................ 426/632, 634, 443, 455, 426/456, 459, 460, 465

[56] References Cited

U.S. PATENT DOCUMENTS 3,660,111 5/1972 Koch ......................................... 99/98
4,816,270 3/1989 Turner .................................. 426/632

OTHER PUBLICATIONS

Woodruf, J., 1973, Peanuts: Production, Processing, Products, 2nd. Ed., Avi Publishing Co., Westport, Conn., p. 100.

*Primary Examiner*—Jeanette Hunter
*Assistant Examiner*—Helen F. Pratt
*Attorney, Agent, or Firm*—Jones & Askew

[57] ABSTRACT

Palatable boiled and seasoned peanuts in the shell which can easily be split into two by pressing with fingertips are preferable as a relish for beer or other alcoholic beverages and as a snack per se. This peanut product can be produced by boiling and seasoning raw peanuts with shell including not more than 38% (on a dry matter basis) of lignin in its raw shell, so as to control the moisture content of the shell in said boiled and seasoned product to within the range of 10 to 55% and preferably, and so as to obtain an average lightness value (L) on the color-difference meter of not less than 40. More preferably, it is desirable that the moisture content in the seed becomes 15 to 41% (on a dry matter basis). The degree of the easiness in splitting by fingers can be determined by measuring the disruptive strength of the half shell by texturometer. The preferred texturometer unit for disruption of the half shell is 1 to 7 in the above boiled and seasoned peanuts with shell.

7 Claims, 4 Drawing Sheets (Disruptive strength of the half shell of peanuts having several different lignin contents)

Easiness of splitting by fingertips (orgnoleptic estimation by 9 panelists)

1 ; Very easy

2 ; Much easy

3 ; Easy

4 ; Comparatively easy

5 ; Natural

BOILED AND SEASONED PEANUTS WITH SHELL, AND METHOD FOR PREPARATION THEREOF

TECHNICAL FIELD

This invention relates to new boiled and seasoned peanuts with shell, which are preferred as an accompaniment with alcoholic beverages or as a snack food itself, and a method for preparation therefor.

BACKGROUND OF THE INVENTION

Immature green soybeans, so-called "EDA-MAME" in Japan, are a favorite food which is eaten with beer because of its light taste, and now it has an established position in relish foods.

More recently, green seeds of peanuts which have a peculiar taste different from green soybean has attracted common attention instead of green soybean. But the former has a problem about its producibility because it has a short harvesting period as short as only one week, and further, according to an authentic opinion, it must be dug up at early morning and immediately boiled in the factory within that day in order to prevent said unripe peanuts from rapid deterioration in its quality which is caused by physico-chemical reactions. However to precisely determine the time to be harvested and to exactly keep such a strict time are much difficult, rather almost impossible for every farmers. Accordingly, although there have previously been marketed some kinds of products originated from the unripe raw peanuts which were packed in a can or film pouch with retort process, but also they are not palatable to be favored.

Under the above circumstances in the supply of boiled and seasoned peanuts derived from immature green peanuts, the present invention is directed to provide new boiled and seasoned peanuts with shell which are accommodate with common favorite as a snack or an accompaniment with dry liquors and its shell can easily be split into two with fingertips starting from mature peanuts with shell which can be stored for 2 years or more under comparatively loose conditions, e.g., at 15 centigrade and 60% relative humidity.

SUMMARY OF THE INVENTION

As the result of organized studies directed to the means for solving the above problem, we have found that the greatest problem in commercial production of boiled and seasoned peanuts with shell depends on whether the shell of the peanuts is ready to be split by fingers or not. Different far from green soybean, the seeds of peanuts are enveloped with considerable hard shell. Therefore, if the consumers feel difficult to split said shell off at their eating, it becomes difficult to be commercialized. In the basis of this recognition. We have further investigated for the factors which are seemed to be concerned with the ease of the splitting in the boiled peanuts, and as the result of this study, we have found that the contents of lignin and moisture after boiling are materially related to the difficulty of the splitting, and this finding has brought the present invention as set forth in the below.

DETAILED EXPLANATION OF THE INVENTION

The gist of the present invention exists in boiled and seasoned peanuts with shell wherein the content of lignin is not more than 38% (as the dry matter basis) and the moisture contents 10 to 55%, in the shell, respectively: and a method for preparation of boiled and seasoned peanuts with shell wherein raw peanuts including not more than 38% (in the dry matter basis) of lignin in its raw shell are boiled and seasoned so as to control the moisture content in the boiled and seasoned product to within the range of 10 to 55%. The elements composing the above invention and the related matters will be sub-paragraphically explained in the below.

(1) Lignin and Moisture Content

Figure 1:
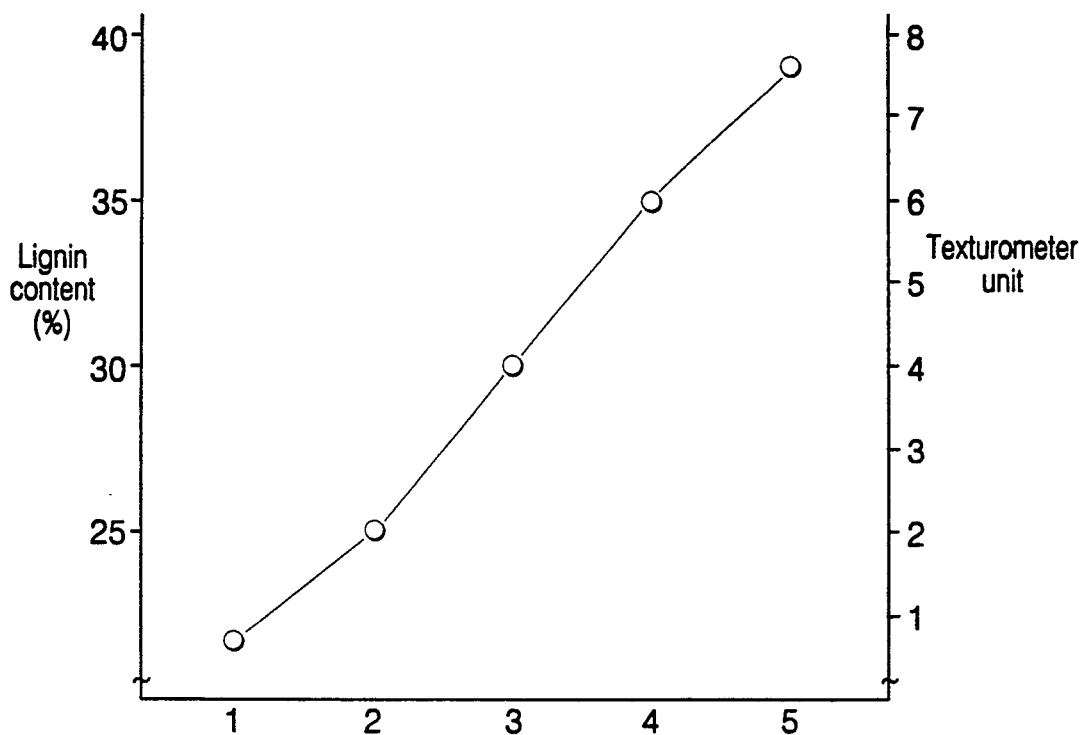
FIG. 1 is a graph showing the relationship of the lignin content in the raw peanuts with the easiness in its splitting.

Lignin is a complicated phenolic polymer compound (which is a generic name for the compounds belongs to this compound group and it is not sole compound) composing vegetable cells with cellulose, pentosan etc. and the shell of peanuts still includes large amount of lignin. According to our repeated experiments done to numerous specimens of the shells of peanuts, it has recognized that there is a relationship between the content of lignin and the easiness of splitting in the range of the 10 to 55% of the moisture (as shown by attached FIG. 1) so as to enable us to easily split the boiled peanuts into two when a perpendicular force acts onto the suture of the tested boiled peanuts irrespective of the differences in varieties so long as the lignin content lies in the range of 22.0 to 38.0%, and that the strength of this force can be objectified through texturometer (Referred to FIG. 1).

We have not been able to find out any peanuts having less than 22.0% of lignin in their shells. Alternatively, high-lignin content peanuts over 38.0% can hardly be split by fingers.

Figure 2:
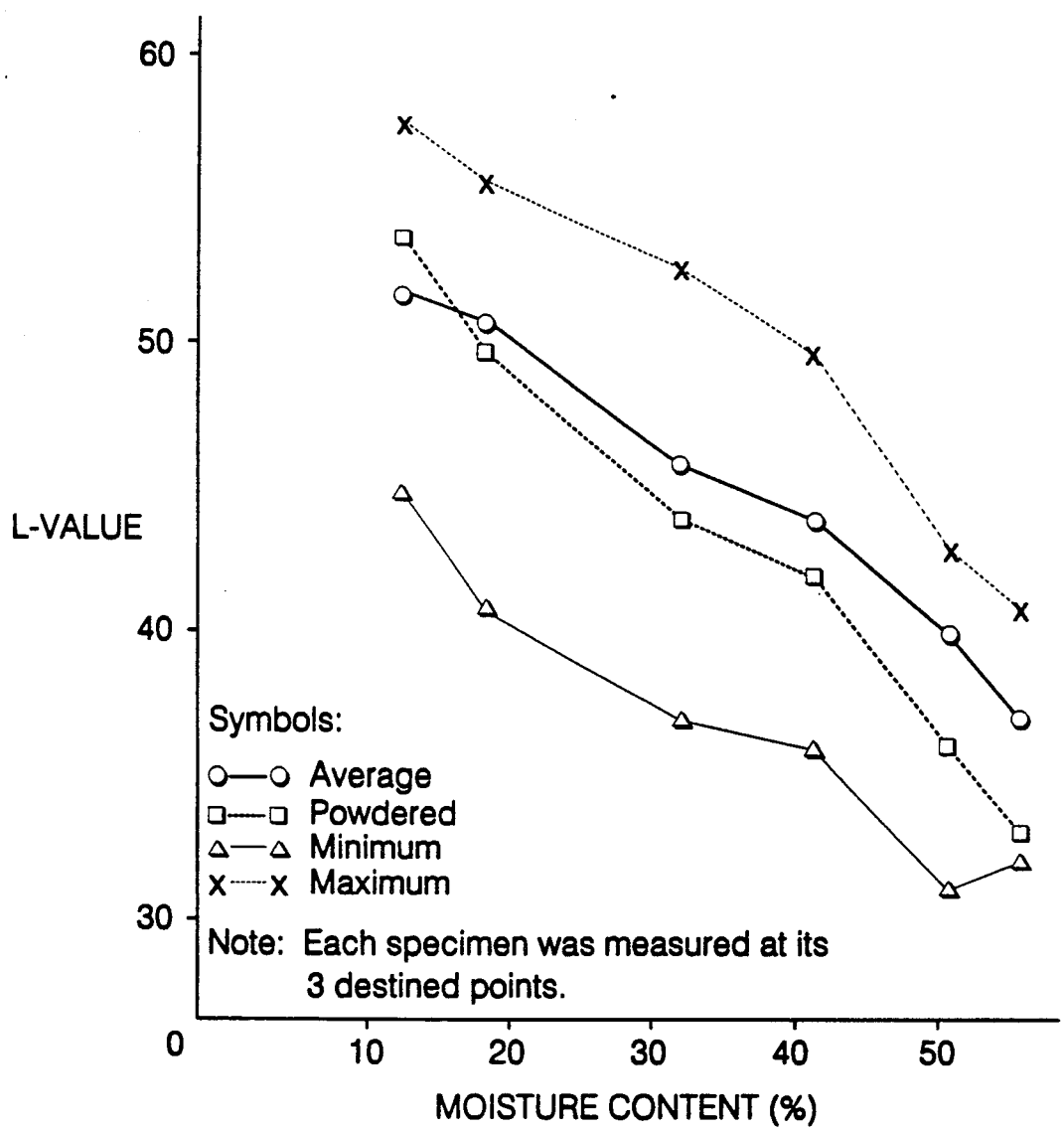
FIG. 2 is a graph showing the relationship of the moisture content in the shell with 26% of lignin with the lightness of the shell.

Furthermore, the content of the moisture in the shell is also concerned with the appearance of the final product. As the moisture content decreased, the color of the shell becomes more light as shown by attached FIG. 2 and the following Table 1 in which the specimens of peanuts having different average moisture content (%) from 55.5 to 13.5 in the shells with 26% (average) of lignin were measured as for the average lightness value in 20 shells at each three destined points by color-difference meter (furnished from Nippon Denshoku Kogyo Ltd., Japan). In this experiment, the preferred peanuts with a preferred light appearance have had the lightness value (L) of not less than 40. Thus, in the light of the commercial value of the product, it is preferred that the moisture content of the product is decreased down as possible, in other word, rising the lightness value (L) of the shell over 40 by drying so far as it does not make difficult to split the shell off.

TABLE 1

(Relationship between the moisture content in the shell and the lightness value (L) of the shell having 26% lignin content, respectively)

| Specimens | | Average | Minimum | Maximum | Powdered |
|---|---|---|---|---|---|
| 1 | Moisture (%) | 55.5 | " | " | " |
|   | L-value | 37.25 | 32.63 | 41.62 | 33.35 |
| 2 | Moisture (%) | 50.5 | " | " | " |
|   | L-value | 40.15 | 31.07 | 43.38 | 35.84 |
| 3 | Moisture (%) | 41.5 | " | " | " |
|   | L-value | 43.53 | 36.22 | 49.97 | 42.14 |
| 4 | Moisture (%) | 32.5 | " | " | " |
|   | L-value | 45.72 | 37.01 | 52.26 | 44.45 |
| 5 | Moisture (%) | 18.5 | " | " | " |
|   | L-value | 50.19 | 41.04 | 55.76 | 49.61 |
| 6 | Moisture (%) | 13.5 | " | " | " |
|   | L-value | 51.86 | 44.91 | 57.52 | 53.74 |

(2) Quantitative Analysis of Lignin

The quantitative analysis used in the present invention is in accordance with ADF-Lignin Measurement by Van Soest. The detail of this measurement will be set forth referred to "Revised Handbook for Food Analysis (English translation)" by Kenpakusha Ltd., Japan, as follows:

(a) Reagents (i) Acidic detergent solution: 20 g of cetyltrimethylammonium bromide are dissolved into 1 L of 1N sulfuric acid under warming.

(ii) 72% Sulfuric acid: 1177 g of concentrated sulfuric acid (specific gravity is 1.84) are diluted with water to 1 L. Thus, the specific gravity will be decreased down to 1.63.

(iii) Decalin: Commercial grade (a mixture of cis- and trans-isomers).

(b) Procedures 1 g of sample (the shell of peanuts to be measured) is boiled for 60 minutes with 100 ml of the acidic detergent solution with 2 ml of decalin equipped with a reflux cooler and then filtered with a glass filter (IG3). The residue in the filter is then washed with acetone and thereafter air-dried. Then, the filter is transferred into a beaker of 100 ml-volume and then allowed to stand for 4 hours at 20 centigrade with 72% sulfuric acid added into said filter with agitation at intervals. In this procedure, if the sulfuric acid has been passed through the filter, the sulfuric acid is then returned into the filter. Finally, the residual content in the filter is transferred into a 500 ml-volume beaker together with the sulfuric acid which has leaked into the beaker through the filter including the residue attached to the inner wall of the beaker washed away with the sprayed distilled water. Then, the total amount of the liquid in the beaker is controlled to 400 ml and allowed to stand over night. Thereafter, the liquid in the beaker is filtered by suction through a filter paper made of glass fiber(GA-200 by Toyo-Roshi and Co., Japan) on a Gooch crucible and washed with hot water until the filtrate is not acidic followed by washed twice with hot water, air-dried and further dried at 100–105 centigrade until the weight has reached to constant. The crucible is then heated in an electric oven at 500 centigrade to constant. ADF-lignin content (%) can be calculated by the following formula.

$$\text{ADF-lignin content (\%)} = \frac{\text{Weight of ADF-lignin (g)}}{\text{Weight of the sample (g)}} \times 100$$

(3) Measurement of the Disruptive Strength by Texturometer

The disruptive strength of the shell can objectively be determined by texturometer which customarily used in common food technology for studying the textures of the non-liquid foods. In this invention, the texturometer used was supplied by Zenken Co., Ltd., Japan. A plunger made by "Lucit-22(Trademark of E. I. Dupont)" was used. The half shell (a half after split into two along with the suture) having 30% of the moisture content is pushed with the plunger along with the suture at 2 mm clearance to measure the disruptive strength. As shown by the attached FIG. 1, there can be seen a clear relationship between the easiness in splitting by fingers, and the disruptive strength by the texturometer and the content of lignin. As seen from FIG. 1, the shell with the disruptive strength of 1 to 7 as the texturometer unit, inter alia, that of 1 to 4 is easy to be split by fingers.

(4) Varieties of Peanuts

As the varieties of peanuts(*Arachis hypogaea* Linné), there are several varieties such as Virginia, Spanish, Valencia, Runner, Flo-runner etc. and the number of seeds in the their shells are varied from 1 to 6. Although this invention is not concerned with the kinds of the cultivated varieties, however, among the similar level of the lignin content, it is preferred that the thickness of the shell is as thin as possible. In view of the thinness of the shell, the Valencian is one of the preferred.

(5) Preparation of the Boiled and Seasoned Peanuts

Figure 3:
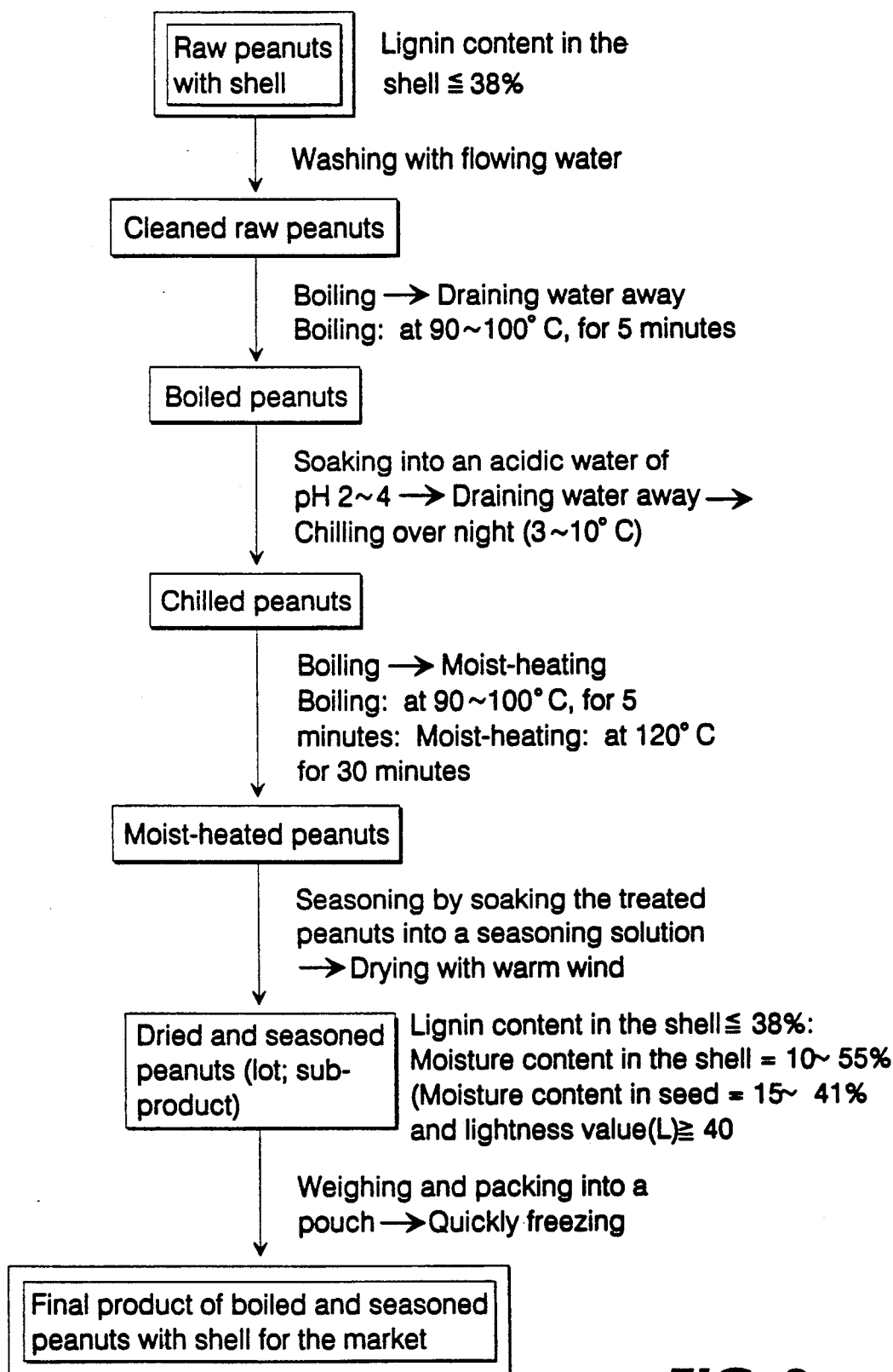
FIG. 3 is a flow chart showing a typical processes for manufacturing boiled peanuts according to the present invention.
Figure 4:
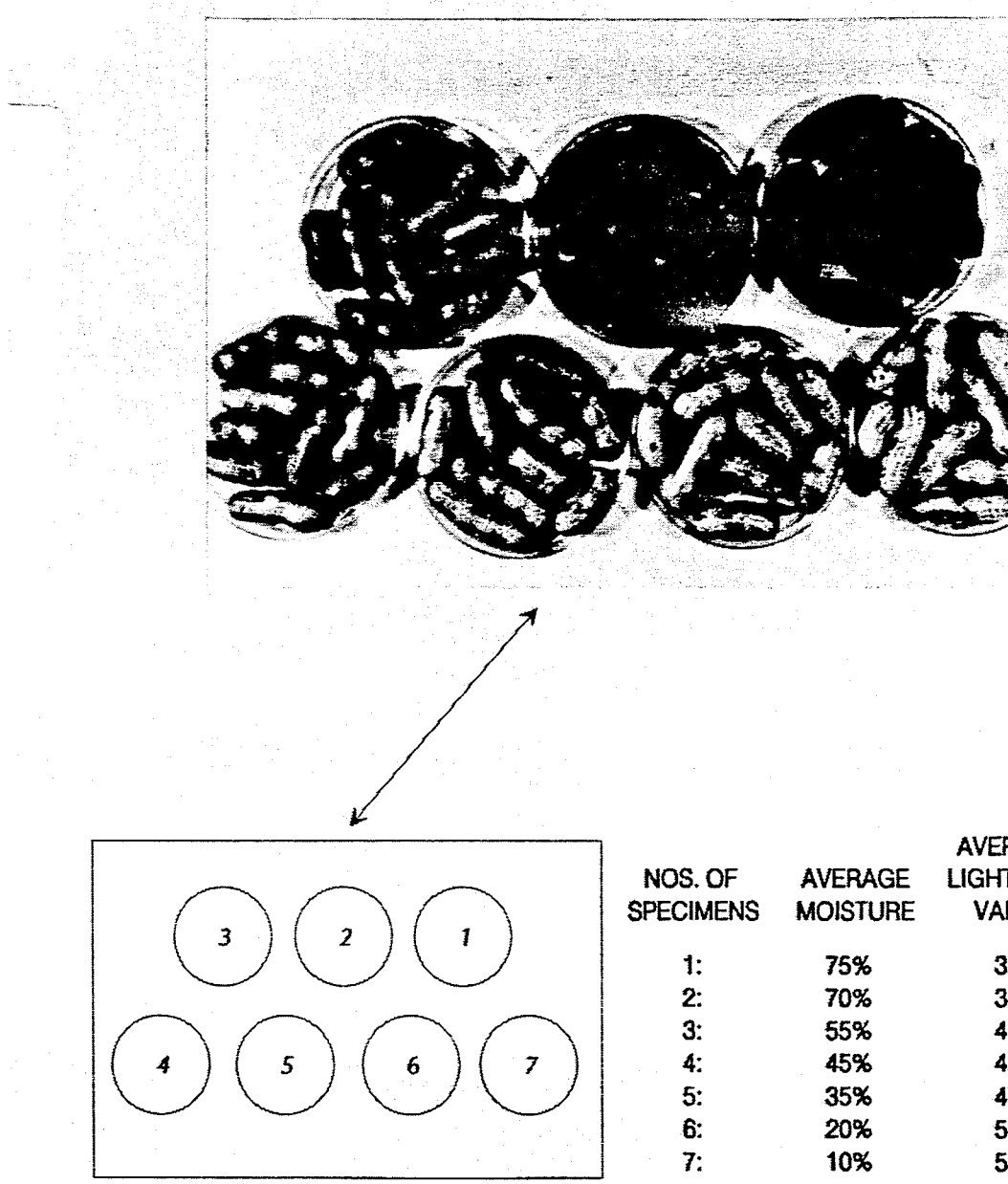
FIG. 4 is a photograph and related explanatory data with regard to seven specimens.

Now referred to the attached FIG. 3, first of all, bagged varieties of raw peanuts with shell are sorted in the aspect of its lignin content and the one having not more than 38% of lignin(at the dry matter basis) is chosen. But, this sorting may be omitted if the averaged upper value of the lignin content of the varieties used has already been known.

Next, the sorted peanuts are washed with water to remove sand and dust on the surface of the shell, soaked into hot water of 90 to 100 centigrade by which the water is absorbed into the shell, re-soaked into an acidic water of pH 2 to 4, and then re-soaked into hot water repeatedly, whereby the tannin in the shell and skin around the seeds will become insoluble through these procedures, the shell is boiled to soften the seeds by the absorption of water. Besides, the above soaking into the acidic water is effective for fixing the tannin in the shell. Therefore, without the above resoaking in acidic water, the shell will be stained by the tannin. The peanuts thus inacivated as for tannin, are then seasoned in a liquid seasoning mainly composed of cooking salt and sugar, however, other additives such as spices, monosodium glutamate, edible organic acids, dry liquors etc., may be added, if desired.

The boiled peanuts with shell are then dried so that the moisture contents in the shell and seed can be controlled to 10 to 55% and 15 to 41%, respectively, and more preferably the average lightness value(L) of the shell may become 40 or higher. Finally, the dried products thus obtained are further quickly frozen to get desired objective. The dried shell is most easily split into two when the moisture content is around 30%. If the moisture content is under 10%, it is too hard to be split off and reversedly, if the moisture content is over 55%, it becomes too soft to be split off.

The boiled and seasoned peanuts with shell thus obtained have somewhat tanned appearance compared with raw peanuts with shell. And it can be split into two when the rectangular force towards its suture face is given so as to give palatable seeds from it.

(6) Conclusion

The contents of lignin and moisture contents of the shell will clearly reflect on the degree of the easiness in splitting the shell of peanuts. If the amount of the lignin is over 38% in the dry matter basis, it becomes difficult to split with fingers even in the controlled amount of the moisture. Additionally, the boiled and seasoned peanuts with shell having the moisture content within the range of 10 to 55% can easily be split into two by fingertips, but if the moisture content is under 10% or over 55%, it becomes difficult to split by the fingertips even through the lignin content is within the above range. This is presumably due to the change in strength of the cell wall in the shell by the amounts of lignin and moisture. Moreover, the degree of whiteness(lightness) of the shell measured by color-difference meter is available as a parameter to determine the degree of the drying in the course of the preparation.

EXAMPLES

Now, the invention is more fully and concretely explained by the foregoing example, but the descriptions is for the explanation only and not for the limitation.

10 kg of Valencian peanuts(averaged lignin content of 26.0% with averaged moisture content of 8%)were washed with tap water and then boiled for 5 minutes at 90 to 100 centigrade. After the water was drained away from the surface of shell of the peanuts, the drained peanuts with shell were soaked into an acidic water solution(pH 2)consisting of 97.2 parts by weight(and so on) of water, 2 parts of ascorbic acid and 1 part of sodium acetate for 50 minutes and then stored at a low temperature over night.

Next day, there was repeated thrice a procedure boiling at 90 to 100 centigrade for 5 minutes to the soaked peanuts with shell followed by moist-heating with pressurized steam at 120 centigrade for 30 minutes. The boiled peanuts with shell thus obtained were then soaked into a seasoning solution(pH 3.7) composed of 86% of water, 7% of sugar, 6.5% of cooking salt and small amounts of monosodium glutamate and cooking wine for 5 minutes for seasoning and then dried for one hour at 80 centigrade in order to obtain a sub-product of boiled and seasoned peanuts with shell. Yield: 13.6 kg.

The above sub-product was packed into plastic pouches so that each pouch may contain 100 g of said product and quickly frozen to −30 centigrade whereby 130 pouches of the final products for the actual market were obtained. Each product in the pouch contained ca. 25% of moisture and shell was easily split into two when a rectangular force towards its suture line.

We claim:

1. Boiled and seasoned peanuts having a shell which may be easily split, wherein the lignin content of the shell is not more than 38% on a dry matter basis and the moisture content of the shell is from about 10 to about 55%.

2. Boiled and seasoned peanuts with shell according to claim 1, wherein the moisture content of the peanut is from about 15 to about 41% and the disruptive strength of the half shell is 1 to 7 texturometer units when measured by a texturometer.

3. Boiled and seasoned peanuts with shell according to claim 1 or 2 wherein the average lightness value (L) according to a color-difference meter is not less than 40.

4. A method for preparation of boiled and seasoned peanuts with shell, wherein raw peanuts having a lignin content in the raw shell of not more than 38% on a dry matter basis are boiled and seasoned so that the moisture content of the shell of the boiled and seasoned product is from about 10 to about 55%.

5. A method for preparation of boiled and seasoned peanuts with shell according to claim 4, wherein the moisture content of the peanut is from about 15 to about 41% and the disruptive strength of the half shell is within the range of 1 to 7 texturometer units when measured by a texturometer.

6. A method for preparation of boiled and seasoned peanuts with shell according to claim 4 or 5, wherein the peanuts with shell are soaked in acidic water and then resoaked in hot water for inactivating tannin in the shell.

7. A method for preparation of boiled and seasoned peanuts with shell according to claim 4 or 5, wherein the boiled and seasoned peanuts are dried so that the average lightness value (L) of the boiled and seasoned peanut according to color-difference meter is not less than 40.

* * * * *